United States Patent Office 2,727,806
Patented Dec. 20, 1955

2,727,806

PRECIPITATION OF URANIUM FROM ALKALI METAL CARBONATE SOLUTIONS

Frank A. Forward and Jack Halpern, Vancouver, British Columbia, Canada, assignors to National Research Council, Ottawa, Ontario, Canada, a body corporate of Canada No Drawing. Application August 1, 1952, Serial No. 302,226

4 Claims. (Cl. 23—14.5)

This invention relates to the separation of uranium from alkali metal and ammonium carbonate solutions. The uranium is present in such solutions in the hexavalent state.

The precipitation and separation of uranium in the hexavalent state from alkali metal carbonate solutions is difficult, and methods for the separation of uranium from such solutions have usually involved the destruction of, or serious contamination of the alkali metal carbonate solution, making it unsuitable for recycling in a leaching process for uranium ores. For instance, such leach solutions may be neutralized with an acid and the uranium subsequently precipitated by the addition of ammonia, or when the uranium content of the solution is high enough, most of the uranium can be precipitated by the addition of an excess of caustic, such as sodium hydroxide. In neither of these cases is the residual solution suitable for treating or leaching a subsequent charge of uranium ore. The amount and cost of reagents used, and the number of operations involved in recovering the uranium from solution often render the soluble alkali carbonate leaching process unprofitable for low-grade uranium ores.

Tetravalent uranium, unlike hexavalent uranium, is completely insoluble in alkali metal carbonate solution. The invention takes advantage of this fact and provides a method of converting the hexavalent uranium in the carbonate leach solutions to the insoluble lower valence form to cause it to precipitate in order that it may be removed with production of soluble alkali metal acid carbonate, which is subsequently, as required, readily transformed to carbonate by caustic treatments.

In accordance with the invention, the alkali metal carbonate solution containing hexavalent uranium is heated with molecular gaseous hydrogen or a gas containing free molecular gaseous hydrogen in a closed zone in which the total pressure is greater than the aqueous vapour pressure of the solution and in the presence of a catalyst, such as metallic nickel, cobalt, or platinum to reduce the uranium to the insoluble tetravalent form, so that it may be removed from the solution e. g. by filtration.

Uranium, as is known, is present in alkali metal carbonate solution in the hexavalent state in a complex ion. $UO_2(CO_3)_3\equiv$ (of the salt, e. g. $Na_4UO_2(CO_3)_3$)

The reduction reaction using molecular gaseous hydrogen in the presence generally of a catalyst, such as nickel, is:

$$Na_4UO_2(CO_3) + H_2 \rightarrow UO_2 + Na_2CO_3 + 2NaHCO_3 \quad (1)$$

Each molecule of hydrogen used in reduction results in the generation of two moles of sodium acid carbonate.

If the uranium is obtained originally in the carbonate solution by oxidative leaching of a pitchblende ore—$U_3O_8$cf. Uraninite, the reaction is:

$$U_3O_8 + 1/2O_2 + 3Na_2CO_3 + 6NaHCO_3 \rightarrow$$
$$3Na_4UO_2(CO_3)_3 + 3H_2O \quad (2)$$

An overall equation, combining (1) and (2) for precipitation and leaching may be written thus:

$$U_3O_8 + 1/2O_2 + 3H_2 \rightarrow 3UO_2 + 3H_2O \quad (3)$$

Except for interfering or side reactions, only oxygen and hydrogen are consumed and tetravalent uranium and water are produced.

In general, catalysts which are suitable for hydrogenation of organic compounds activate the reaction. In powder form, nickel and cobalt have remained active for many successive treatments. If used in the form of a mesh fabric, no catalyst appeared in the precipitated $UO_2$.

The following examples are illustrative of operation of the method:

(1) A typical leach solution from a pitchblende ore had the following composition:

| | |
|---|---:|
| $U_3O_8$ (equivalent) _____gm. per liter__ | 2.04 |
| $Na_2CO_3$ _____gm. per liter__ | 21.4 |
| $NaHCO_3$ _____gm. per liter__ | 22.1 |
| $SO_4$ _____gm. per liter__ | 9.0 |
| As _____ | trace |
| $SiO_2$ _____ | trace |
| $P_2O_5$ _____gm. per liter__ | 0.01 |

200 liters of this solution were charged to an autoclave having in it 4000 grams of metallic nickel powder (74 to 140 microns). The charge was heated to 250° F. (121° C.) with continuous agitation and gaseous molecular hydrogen ($H_2$) was introduced into the autoclave to give a total pressure in the autoclave of 150 pounds per square inch (10.55 kg. per sq. cm.). The partial pressure of molecular hydrogen gas in the autoclave was approximately 120 pounds per square inch (8.44 kg./sq. cm.). The temperature was maintained and agitation continued for two hours when analysis of the solution showed less than 0.01 gram $U_3O_8$ equivalent per liter. Then the agitation was stopped, the nickel was settled and the contents of the autoclave were removed to a pressure filter. Over 99.5% of the uranium was precipitated as $UO_2$ and was largely recovered in the filter cake. The products analyzed:

| Precipitate ($UO_2$) | Barren or Residual Solution, grams per liter |
|---|---:|
| $U_3O_8$ 90% $U_3O_8$ equivalent | 0.01 |
| $Na_2CO_3$ | 23.1 |
| $NaHCO_3$ | 19.7 |
| $SO_4$ | 9.0 |

The crude $UO_2$ product may be further purified by screening and magnetic separation in known ways to remove last traces of nickel powder, which is returned to the autoclave for reuse. In a series of twenty runs on an ore leach solution, using the same nickel powder successively, the reduction rate and amount of $UO_2$ recovered was unchanged.

200 mesh (74 micron openings) pure nickel cloth has been used in place of nickel powder just as successfully, and no nickel was found in the precipitated $UO_2$.

Any convenient amount of nickel may be used. The rate of precipitation increases with more nickel. With one gram of nickel per liter of solution, the rate of precipitation of uranium oxide is 0.6 gram per liter per hour.

The following illustrates the effect of varying the amount of nickel powder.

Table I

| | |
|---|---|
| Initial U₃O₈ equivalent | 5 gms./liter. |
| Na₂CO₃ | 50 grms./liter. |
| Hydrogen pressure | 500 p.s.i.g. |
| Temperature | 250° F. |

| Nickel Powder, gms./liter | Rate of Precipitation, gms./liter/hour U₃O₈ equivalent | Time for Complete Precipitation |
|---|---|---|
| 0 | 0.0 | no precipitation. |
| 1 | 0.64 | 510 minutes. |
| 3 | 3.67 | 120 minutes. |
| 5 | 4.35 | 75 minutes. |
| 10 | 10.4 | 45 minutes. |

The rate of reduction and precipitation increases with the pressure of hydrogen. At low pressures of 15–20 p. s. i. g. the rate is slow. A pressure range of 20 to 75 p. s. i. g. is practical but the rate increases as the pressure is raised to about 500 p. s. i. g. beyond which higher pressure appears to have a little additional effect in accelerating the rate of precipitation. However pressures of 1000 p. s. i. g. or higher of free hydrogen gas may be used if desired.

The following illustrates effects of temperature:

Table II

| | |
|---|---|
| Initial U₃O₈ | 5 gms./liter. |
| Na₂CO₃ | 50 grms./liter. |
| Hydrogen pressure | 400 p. s. i. g. |
| Nickel powder | 5 gms./liter. |

| Temperature | Time for Complete Precipitation, minutes |
|---|---|
| 200° F | 75 |
| 300° F | 40 |
| 350° F | 30 |

A temperature of 250° F. is considered a good approximate level for operation. Temperatures as low as 100° F. result in some but slow precipitation. Temperatures above 350° F. are not as convenient but are quite workable.

Metallic cobalt has been used as a catalyst in precipitation of uranium. The use of a small amount of platinum gauze as catalyst is illustrated by the following example.

Using two square inches of platinum gauze per liter of solution, a temperature of 300° F. hydrogen pressure of 300 p. s. i. g. for 10 hours with agitation, a 5% sodium carbonate solution containing 5 gms./liter of U₃O₈ equivalent caused the precipitation of 50% of the uranium as UO₂. Precipitation was continuing to completion when the test was stopped. The slow rate of precipitation was due to the small surface area of catalyst present. In general, catalysts suitable for hydrogenation of organic compounds display activity in the process.

Less than 1 gram/liter of nickel powder is effective as a catalyst. One-quarter of a gram or less will give precipitation. At least 0.1 gram metallic nickel should be present to obtain precipitation of the uranium.

The term hydrogenation catalyst in this specification and claims is intended to include catalysts used in the hydrogenation of organic compounds.

Hydrogen pressures are technically operative, even when the partial pressure of the hydrogen is low, even less than five p. s. i. g., but the rates become unpractically low. Approximately 50 p. s. i. hydrogen gas is considered a fairly good operative pressure. 30 p. s. i. hydrogen has been used—precipitation took longer.

Reference has been made to leaching operations for ores and other materials containing uranium. The present precipitation process is advantageously combined with a leaching process for uranium in materials containing it. An example of such a leaching operation which is well known comprises comminuting the uranium materials to render the uranium accessible to a leach solution, which contains alkali metal carbonate in appropriate amounts, for example 20 to 50 grams/liter, which is applied to the uranium materials under conditions such that uranium is dissolved and removing the solution of uranium in the hexavalent state from the solid residue.

The abbreviations p. s. i. and p. s. i. g., used herein, mean—pounds per square inch and pounds per square inch gauge, respectively.

What is claimed is:

1. A method of precipitating uranium from aqueous solutions of alkali metal carbonate which comprises incorporating a hydrogenation catalyst in the solution, agitating the mass, introducing free molecular hydrogen into the mass in a closed reaction zone to provide hydrogen partial pressure of 15 to 500 p. s. i., heating the mass at 100 to 350° F. to precipitate uranium oxide and removing the precipitated uranium oxide from the mass.

2. The method defined in claim 1 in which the alkali metal carbonate comprises normal alkali metal carbonate and alkali metal bicarbonate.

3. The method defined in claim 1 wherein the catalyst is metallic nickel in proportions of more than 1 gram per liter of solution.

4. The method defined in claim 1 wherein the mass is heated at 200 to 350° F. and the hydrogen pressure is at least 50 p. s. i.

References Cited in the file of this patent

UNITED STATES PATENTS

| | | |
|---|---|---|
| 1,495,538 | Thews | May 27, 1924 |

OTHER REFERENCES

Mellor, Comprehensive Treatise of Inorganic and Theoretical Chemistry, vol. I, page 332 (Reprint 1946). Longmans, Green and Co., London. Copy in Scientific Library.

Rideal et al.: Catalysis in Theory and Practice, page 455 (1919). MacMillan and Co., Ltd., London. Copy in Scientific Library.

Boswell et al.: Chemical Abstracts, vol. 18, page 1077, (1924).

Bachelet et al.: Bulletin de la Societe Chimique de France, Jan.–Feb. 1952, pages 55–60. (Copy in Scientific Library).